2 Sheets—Sheet 1.

A. E. HOTCHKISS.

CLOCK MOVEMENT.

No. 10,062. Reissued Mar. 14, 1882.

Witnesses.

Frank P. Smith

Herbert E. Fowler

Inventor

Arthur E. Hotchkiss by Geo. Gerry Atty

2 Sheets—Sheet 2.

A. E. HOTCHKISS.

CLOCK MOVEMENT.

No. 10,062. Reissued Mar. 14, 1882.

Witnesses.

Frank P. Smith

Herbert E. Fowler

Inventor.

Arthur E. Hotchkiss

Geo. Berry Atty

UNITED STATES PATENT OFFICE.

ARTHUR E. HOTCHKISS, OF CHESHIRE, CONNECTICUT.

CLOCK-MOVEMENT.

SPECIFICATION forming part of Reissued Letters Patent No. 10,062, dated March 14, 1882.

Original No. 221,310, dated November 4, 1879; Reissue No. 9,656, dated April 12, 1881. Application for reissue filed July 19, 1881.

*To all whom it may concern:*

Be it known that I, ARTHUR E. HOTCHKISS, of Cheshire, in the county of New Haven and State of Connecticut, have invented certain new and useful Improvements in Clock-Movements, of which the following is a description.

My invention relates to an improvement in clock-movements, the object being to make a clock-movement which shall be simple and durable in its construction, of small initial cost in manufacture, and the several parts of which shall be relatively arranged in such manner that the movement may be inclosed in a small and compact case.

To this end the invention consists essentially in dividing the train into two parts; in arranging the divisions of the train in a frame having three plates; in providing an additional wheel and pinion between the escape-wheel and center wheel; in making the three wheels between the escape-wheel and center wheel with the same number of teeth and of the same size; in arranging the pivots of the three arbors carrying the three like wheels and pinions between the escape-wheel and center wheel in the circumferences of circles which are concentric with the center arbor, and in other minor improvements as the invention is hereinafter more fully described and explained by reference to the drawings.

Figure 1:
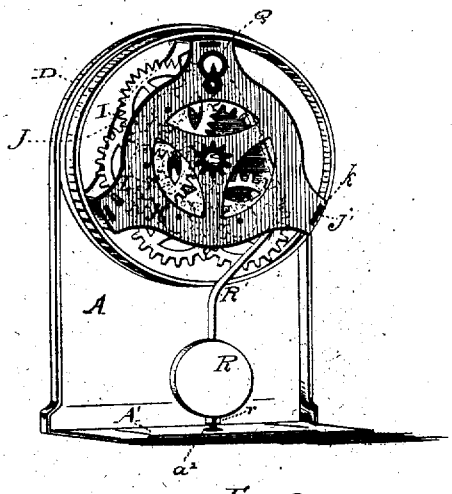
Figure 2:
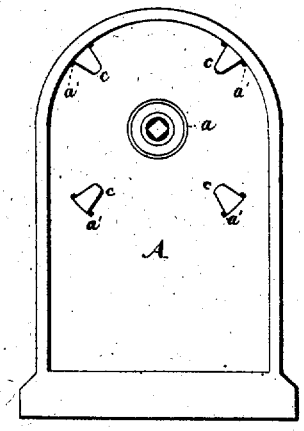
Figure 3:
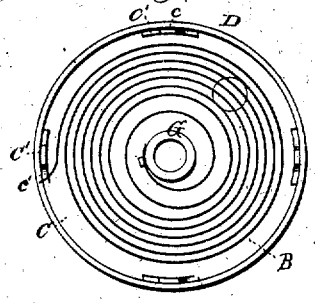
Figure 4:
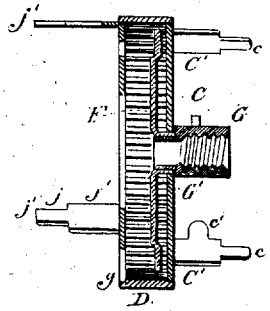
Figure 5:
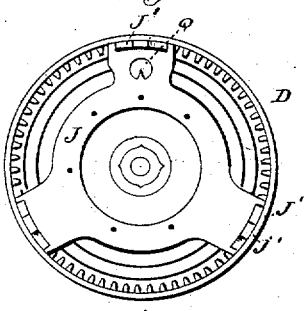
Figure 6:
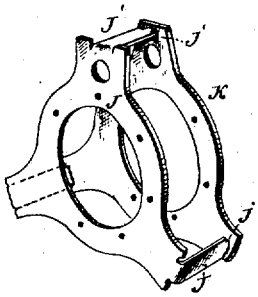
Figure 7:
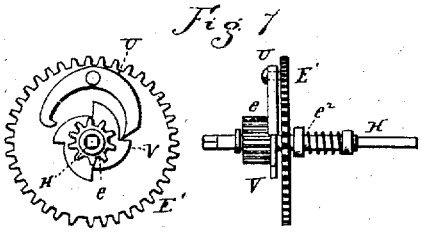
Figure 8:
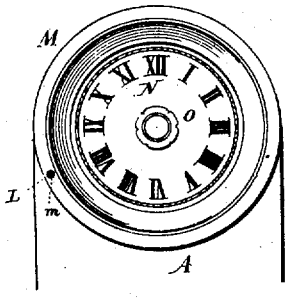
Figure 8:
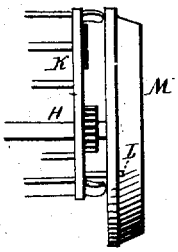
Figure 9:
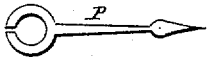
Figure 10:
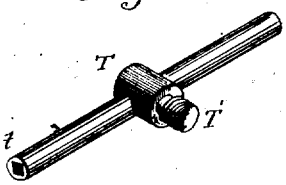
Figure 13:
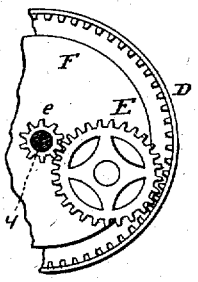
Figure 11:
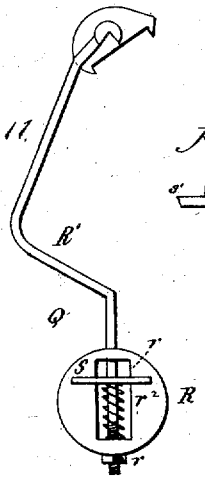
Figure 12:
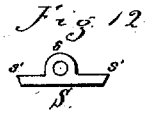

In the accompanying drawings, Figure 1 is a perspective view of the movement as it is arranged in the case. Fig. 2 is an elevation of the back of the clock-case. Fig. 3 is a view of the mainspring and hub to which the inner end of the spring is attached, and of the back plate and posts by which the movement is attached to the case, to one of which the outer end of the spring is attached. Fig. 4 is a section of the back and middle plates, and of the rotating disk and its hub. It shows also two of the posts for attaching the movement to the case; also, two of the pillars for connecting the front plate to the middle plate and a portion of the rack. Fig. 5 is a front view of the recessed circular rack and middle plate in position. Fig. 6 is a view of the front and middle plates and the pillars by which they are connected. Fig. 7 is a view of the pawl or dog attached to the center wheel, of the ratchet-wheel, center pinion, and center arbor. In Fig. 8 are two views of a dial. Fig. 9 is a view of a minute-hand. Fig. 10 is a view of the key. Fig. 11 is a view of the pendulum, of the device for holding the ball against the adjusting-nut, and of the verge. Fig. 12 is a view of a guide for the pendulum-ball. Fig. 13 is a view of portions of the rotating disk and rack, of the center pinion, and planet-wheel for connecting the rack with the center pinion.

To enable others to make my improved movement in the way contemplated, I will describe its several parts in detail, and also the means by which the movement is attached to the case.

The frame of the movement is made with three plates, a front, middle, and back plate, the front and middle plates being connected by pillars, and the middle and back plates by the rack. The front plate, K, and the middle plate, J, Fig. 6, are punched from sheet metal, and are "open plates," as this kind of plates are called—that is, they are punched with such parts only as are requisite for the support of the train and for connecting the plates. The middle plate, J, is punched with projections which are bent at right angles to the plate, and form sheet-metal pillars J′. The front ends of these pillars are narrower than their other parts, and shoulders are thus formed on the pillars. These narrow ends pass through slots in the front plate, K, and are twisted to hold the plate against the shoulders. The back plate, C, Figs. 3 and 4, is a circular sheet-metal plate, and is punched with projections which are bent at right angles to the plate and form sheet-metal posts C′. The rear ends of these posts are narrower than their other parts, and shoulders are thus formed on the posts. These narrow ends pass through slots in the back of the case, and are bent downward to hold the movement to the case, as shown in Fig. 2. On one of these posts a side piece, *c′*, Fig. 4, is formed, which is bent, and forms a pin to which the outer end of the mainspring is attached in the usual manner. These posts not only hold the movement to the case, but perform the function of the outer part of a mainspring-barrel, in that they hold the spring when it is unwound. The middle plate, J, is connected to the back plate, C, in the following manner: The rack D has a recess, *g*, Fig. 4, formed in its front side, which is a little deeper than the thickness of the middle plate, J. Into this recess the middle plate fits and is placed. The edge of the recess is set over the plate and holds it to the rack. The back plate, C, is placed in a like recess on the rear side of the rack, and is held to the rack in the same manner. It will be noticed that the rack answers the purpose of pillars, in that it connects the middle plate, J, to the back plate, C.

The train of the movement consists of the center wheel, E′, escape-wheel and pinion on its arbor, the three like wheels with the pinions on their arbors between the center wheel and escape-wheel, and of the center pinion, *e*, and rack D, which are connected by the planet-wheel E. The train is divided into two parts between the center wheel and center pinion—that is, the center wheel, escape-wheel, and pinion on its arbor, the three wheels with the pinions on their arbors, between the center wheel and escape-wheel, are arranged between the front and middle plates of the frame and constitute the front part of the train, and the center pinion and rack, which are connected by the planet-wheel, are arranged between the middle and back plates and constitute the back part of the train, the two parts being connected by the center arbor, H, on which are arranged the center wheel and center pinion, and which extends through the front plate and middle plate to the hub G in the back plate, the hole in the middle plate being large enough to allow the center pinion to pass through it.

The escape-wheel has thirty-eight teeth, each of the three like wheels between the escape and center wheels has thirty-two teeth, and the center wheel has twenty-six teeth. The rack has sixty teeth and the planet-wheel has twenty-six. The center pinion has ten leaves and all the other pinions have eight leaves each and the same diameters. The three wheels between the escape and center wheels are of the same size, and the pivots of the arbors on which they are placed and the pivots of the escape-wheel arbor are arranged in the circumferences of circles which are concentric with the center arbor, and are also arranged within a semicircle and in a manner to bring the escape-wheel arbor near the top of the frame.

The center arbor, H, extends through and turns in the front plate, and the minute-hand is attached to its front end, its back end turning in the hub G in the back plate, C. The center wheel, E′, and the center pinion, *e*, are arranged and are free to turn on the center arbor, the wheel being arranged between the front and middle plates, and the pinion between the middle and back plates. Between a shoulder on the arbor and a center wheel a spiral spring is placed which creates friction enough between the arbor and center wheel to turn the arbor, dial-work, and hands, and allows the hands to be moved and set to the right time. On one end of the center pinion the ratchet-wheel V, Fig. 7, is rigidly attached, and the center pinion comes against a shoulder on the arbor back of the pinion. The pawl U, Fig. 7, is pivoted to the center wheel, is nearly semicircular in form, and resembles a verge in a recoiling escapement. It extends nearly half-way round the ratchet-wheel, and the direction of the force of the ratchet in its forward motion is between an end of the pawl and its pivot, and the ratchet forces the ends of the pawl in and out of the teeth of the ratchet alternately, one of the two ends of the pawl being constantly back of a tooth of the ratchet. In its backward motion the ratchet has no action on the pawl, and a tooth of the ratchet comes against an end of the pawl and prevents the turning of the ratchet.

The circular rack D, Figs. 5 and 13, has teeth cut on its inside, and forms a part of the frame and also a part of the train, as before mentioned. The circular rotating disk F is punched from sheet metal, and has a central perforation. The small end G′ of the hub G is passed through a central opening in the back plate, C, into the central perforation in the disk, and is soldered to the disk. The disk and hub are thus united, are held to the back plate, and are free to turn in the same. The hub G has a central perforation in which the rear end of the center arbor turns. The perforation in the rear part of the hub is enlarged and is threaded. Into the large end of the hub G a pin is inserted, which forms the usual fastening for the inner ends of mainsprings. The planet-wheel E turns on a stud in the circular disk F, and connects the rack with the center pinion.

The verge and pendulum arbor is shown in Fig. 1, and is supported on sharp edges or points. This mode of hanging a pendulum was patented to me on November 28, 1876, and to this patent I refer for a full and accurate description of this manner of hanging a pendulum. The pendulum-rod is formed to clear the arbors between the front and middle plates, and has its lower end threaded and provided with an adjusting-nut in the usual manner. On the lower end of the rod the plate S, Fig. 12, is suitably fastened, which is a straight bar with a perforated part, *s*, formed on one of its sides near the middle of the bar. In the back of the pendulum-ball a slot is formed. The rod passes through the ends of the slot, through the perforation in the plate S, and through a spiral spring placed in the slot, into the adjusting-nut. This device prevents the turning of the ball on the rod and forces it against the adjusting-nut, and is shown in Fig. 11.

The mainspring B is the ordinary spring used in movements, and is attached to the hub G and to a post in the back plate, C, in the usual and well-known way. It is centrally arranged in the frame, and the room for its expansion varies with the size of the back plate, C.

The key is a short round rod, one of its ends being turned down and threaded, leaving a shoulder, as shown in Fig. 10. The threaded end is made to fit the threaded perforation in the hub G. Through the large end a small rod passes and forms arms by which it is turned. In the end of one of these arms a rectangular recess is formed which fits the back end of the center arbor and the adjusting-nut on the pendulum-rod, and constitutes the means by which these parts are reached without opening the case of the clock.

The dial-work in my movement is the common dial-work in clock-movements, is well known to clock-makers, and needs no description. The same is true of the dial and hands.

In Fig. 2 the back of the case is shown, and in Fig. 1 the back and bottom, with the opening $a^2$ in the bottom, the back and bottom being made of a single piece of sheet metal.

By the construction of the several parts of the movement and their arrangement, as above described, coarse teeth, large pinions, and pivots may be used, and the movement will give as good results and occupy as little space as ordinary movements with fine and expensive work.

In this specification, the expressions "frame," "escape-wheel," "escape-wheel arbor," "center wheel," "center pinion," and "center arbor" are used in their well-known and technical sense—viz., "frame" denotes the plates, suitably connected, between which the wheels and pinions are arranged, and in which the arbors turn; "escape-wheel" denotes the wheel the teeth of which act on the pallets; the "escape-wheel arbor" the arbor to which the escape-wheel is fastened; "center arbor" the arbor to which the minute-hand is attached, and which is centrally arranged in respect to the dial; and "center wheel" and "center pinion" denote the wheel and pinion which are arranged on the center arbor and form parts of the train, as distinguished from a wheel or pinion on the center arbor (often found in American clocks) which form a part or parts of the dial-work.

I am aware that the frames of movements have been made with three plates adapted to secure particular results; and I am aware that the trains of movements have been divided (in the sense in which I use the word—that is, parts of trains have been arranged between different plates, but not disconnected) and that elongated pinions have been made to pass through back plates into bridges attached to the plate and mesh with wheels held in a similar way; but

What I claim as my invention is—

1. In a clock-movement having a frame consisting of three plates suitably connected together, a train which is divided into two parts, a front part and a back part, the front part arranged between the front and middle plates of the frame, and the back part arranged between the middle and back plates of the frame, the point of division being between the center wheel and center pinion, the said center wheel and center pinion being arranged on the center arbor carrying the minute-hand, as set forth.

2. In a clock-movement having a frame consisting of three plates suitably connected together, the middle plate of the frame, the said middle plate dividing the train into two parts between the center wheel and center pinion, the said center wheel and center pinion being arranged on the center arbor carrying the minute-hand, as set forth.

3. In a clock-movement, a frame consisting of three plates suitably connected together, the middle plate of which divides the train into two parts between the center wheel and center pinion, the said center wheel and center pinion being arranged on the center arbor carrying the minute-hand, and the frame having the parts of the divided train arranged between its three plates, as set forth.

4. In a clock-movement having a frame consisting of three plates suitably connected together, a center arbor carrying the minute-hand and provided with a center wheel and center pinion, the wheel arranged between the front and middle plates of the frame, and the pinion arranged between the middle and back plates of the frame, as set forth.

5. The improvement in a clock-train, consisting of three wheels suitably fastened on arbors carrying pinions, and arranged between the escape-wheel and its arbor carrying a pinion, and the center arbor carrying the center wheel and center pinion, as set forth.

6. The improvement in a clock-train, consisting of three wheels having the same number of teeth and the same diameters, suitably fastened on arbors, the pivots of which are arranged in the circumferences of circles concentric with the center arbor, the several arbors carrying pinions having the same number of leaves and the same diameters, all the said parts arranged between the escape-wheel and its arbor carrying a pinion, and the center arbor carrying the center wheel and center pinion, as set forth.

7. The improvement in a clock-train, consisting in the arrangement of the pivots of the escape-wheel arbor and of the pivots of the three arbors carrying the three wheels and the three pinions between the escape-wheel arbor and the center arbor carrying the center wheel and center pinion in a semicircle, as set forth.

8. In a clock-movement, the combination, with a train divided into two parts, a front part and a back part, by the middle plate of a frame having three plates, the division being made between the center wheel and center pinion, the said center wheel and center pinion being arranged on the center arbor carrying the minute-hand, the escape-wheel being arranged in the front part of the train and near the top of the frame, and the pivots of the front part of the train being arranged within a semicircle, of a pendulum attached to an arbor near the top of the frame and vibrating in a plane passing between the front and middle plates of the frame, as set forth.

9. In a clock-movement provided with a circular rack, the circular disk F, rotated by the mainspring and carrying the planet-wheel E only, which connects the rack with the center pinion, as set forth.

10. In combination with a pendulum-rod provided with the plate S, fastened to the rod, a spring arranged on the rod to hold the pendulum-ball against the adjusting-nut, as set forth.

ARTHUR E. HOTCHKISS.

Witnesses:
GEORGE TERRY,
EARL BROWN.